June 21, 1932.  W. H. WEINBERG  1,863,705
PROCESS OF PRODUCING A BURNER GAS SUPPLY
OF UNIFORM SULPHUR DIOXIDE CONTENT
Filed March 13, 1931
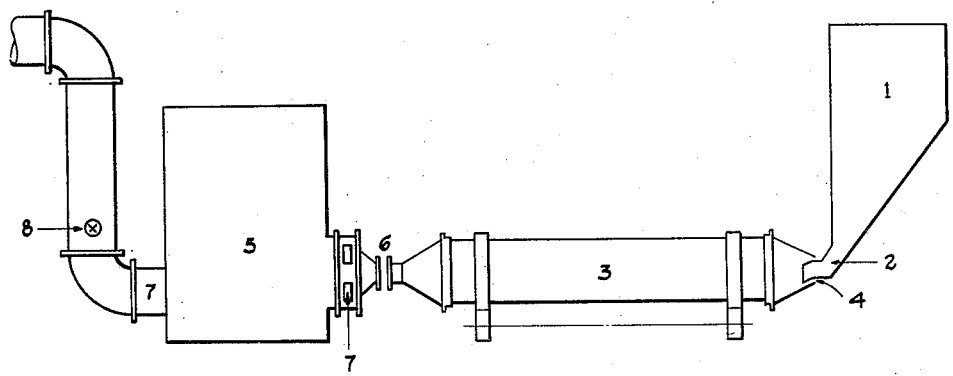
INVENTOR.
BY *Walter H. Weinberg*
*George Lee*
ATTORNEY.

Patented June 21, 1932

1,863,705

UNITED STATES PATENT OFFICE

WALTER H. WEINBERG, OF WEST TOLEDO, OHIO, ASSIGNOR TO THE GRASSELLI CHEMICAL COMPANY, OF CLEVELAND, OHIO, A CORPORATION OF DELAWARE

PROCESS OF PRODUCING A BURNER GAS SUPPLY OF UNIFORM SULPHUR DIOXIDE CONTENT

Application filed March 13, 1931. Serial No. 522,205.

The present invention relates to controlling the operation of sulphur dioxide burners in such a manner that they produce a supply of gases containing a substantially uniform, predetermined amount of sulphur dioxide.

It is very important in the production of sulphuric acid either by the chamber or contact processes that the gases submitted to the reaction contain a uniform amount of sulphur dioxide over long periods of time, as various conditions in the operations of the plants depend entirely upon the concentration of the gases.

Even in standardized operations the concentration of the gases varies within several percent during short periods and modern plants are commonly equipped with automatic apparatus which record by analysis the actual $SO_2$ content of the burner gases as submitted to the reactions.

Such automatic equipment can only be used with purified and cool gases and there is a lapse of time between the production of the gases and their analysis which is in many instances greater than the period of variation.

The production of $SO_2$ by burning elemental sulphur or pyrites is not such a simple process as might appear. Combustion of sulphur takes practically only place in the vapor phase and when air meets hot pyrites or sulphur volatilization of the sulphur takes place under the influence of the heat produced by the burning of part of the sulphur. The sulphur gases travel along with the primary combustion gases and burn gradually with the air present. Practically all sulphur dioxide producing equipments consist therefore of a first volatilization zone in which part of the sulphur only is burned and this is followed by a combustion zone proper in which the combustion is completed.

$SO_2$ burner gases as used in the manufacture of sulphuric acid contain of necessity a large excess of oxygen, and their composition is kept within the range of about 6 to 12% $SO_2$, the lower concentration being used in the contact process, whereas chamber plants can be operated successfully at the higher concentrations.

I have found that within the concentrations useful in sulphuric acid manufacture the temperature of $SO_2$ burner gases before substantial cooling and purification is directly proportional to the concentration of $SO_2$ therein, or in other words to the amount of $SO_2$ produced in a unit time, and that even very slight changes in this amount produce very noticeable changes in the temperature.

I have further found that by regulating the admission of air to the volatilization and combustion zones a uniform amount of sulphur can be burned and final gases of uniform $SO_2$ content can be obtained, and my invention comprises effecting the regulation of the air admission according to temperature variations in the final gases before substantial cooling and purification thereof.

My invention is adapted to the production of sulphur dioxide gases as useful in the manufacture of sulphuric acid, both by burning elemental sulphur as well as by roasting pyrites in processes where one can distinguish between a sulphur volatilization and a combustion zone.

It is in most sulphuric acid producing plants a rule to pass a constant amount of air through the $SO_2$ producing elements, and while my invention is particularly suited to produce a burner gas of uniform $SO_2$ content in such operations, I can also make use of it in other plants where it is preferred to vary the total amount of air introduced.

One of the most common types of sulphur burning equipment used in connection with the manufacture of sulphuric acid consists of a rotary sulphur burner with continuous feed of elemental sulphur; the gases pass from the rotary burner into a combustion chamber, and in the following I shall describe in detail the functioning of my novel process in connection with this type of equipment.

The attached figure shows in a schematic form such a sulphur burner.

1 in this figure is a container for elemental sulphur, from which by some mechanical instrumentality, not shown, sulphur is fed through pipe 2 into the sulphur burner proper 3, which is a rotating tube in which a bed of molten sulphur is kept on fire, air is introduced at the front end of the burner through port holes 4, and the gases which consist of excess air, sulphur vapors and sulphur dioxide, exit into the combustion chamber through the connection 6. There is a void between the burner and the entrance of the combustion space at 6, through which additional air is sucked in, and the opening of the void can be regulated in various manners. The connection 6 is equipped with port holes 7, which can be opened or closed to further adjust the amount of air admitted into the combustion chamber. #5 is the combustion chamber and consists of a sheet iron box of any desired shape, lined with fire bricks; it contains a brick checker work. The final burner gases leave the combustion chamber through pipe 9, from where they go into cooling and purifying equipment as desired. The construction of such a burner is well known in this art and as it is in no way part of my invention it need not be described in detail any further herein.

It will be seen that such a burner has a first volatilization and part combustion zone 3, a final combustion zone 5 and air admissions into both zones at 4 and 6—7.

The gases are moved through the complete burner by means of a blower, not shown, located before or at the end of the cooling and purifying equipment, etc.

To make this burner suitable for the performance of my invention I introduce a temperature measuring device, such as for instance, a thermocouple, into the pipe 9 somewhere near its contact with chamber 5. This is shown in the figure at 8.

When operating this burner for the production of $SO_2$ gases of a concentration between about 6 and 12% $SO_2$, which are the concentrations useful in the manufacture of sulphuric acid, I find that the temperature of the gases at 8 are within the range of about 450 to 800° C.

When operating such a burner in connection with a constant speed air blower, substantially constant amounts of air are passed through the equipment. There will nevertheless, be variations in the composition of the gases which within the above range of compositions will greatly exceed 1% above or below the desired composition. If not quickly checked such variations are exceedingly detrimental to the smooth running of the sulphuric acid plant.

When measuring the temperature of the final gases after they have left the combustion chamber 5, but substantially before cooling, I find that a variation of about 2 to 3° C. corresponds to a difference of 1/10% in the $SO_2$ concentration. Temperature differences as can be observed at the entrance of the gases into 5 or in the body of the combustion chamber, do not have the same significance. At 6 the full heat of combustion is not developed as yet, and within the body of 5 there is so much radiation of heat from the walls of the checker works and there is possibility of local super-heating from combustion flames, so that slight variations in the temperature of the gases are not recorded by a temperature measuring device. As a matter of fact, it is essential, in order to obtain temperature indications useful in my process, to measure the temperature of the gases where they are free from the influence of locally superheated zones or free from the influence of heat radiations within the combustion chamber.

The absolute temperature of the final gases depend, of course, upon the equipment and its heat losses by radiation, upon the burden, or total amount of sulphur burned per day, and also to some extent upon atmospheric conditions, as exist in summer or winter. I found, however, that with a given equipment, gas concentration, and a standard burden, the changes of atmospheric conditions as occur normally within 24 hours influence the temperature not more than 2 or 3° C. It is, therefore, sufficient if with a given burden the correct temperature corresponding to the desired concentration be checked for instance, one a day or even once a week only.

Once this norm is established any increase in temperature at 8 indicates an $SO_2$ concentration higher than desired, and vice versa a decreasing temperature indicates a decrease in the $SO_2$ concentration.

To correct such variations I change the total amount of sulphur burned at each moment by changing the amounts of sulphur burned and volatilized in the volatilization zone, and I achieve this by changing the amounts of air introduced therein.

When the temperature increases I admit less air at 4, whereby with a standard total air admission more air will be introduced at 6 and 7. Less sulphur will then burn and be volatilized in 3 and the gases will be more diluted in 5, or I increase the openings at 6 and 7 with the same result.

When the temperature at 8 decreases I admit more air at 4 with increased primary burning of sulphur and consequent volatilization in 3 and introduction of less air at 6 and 7, or I dampen the openings at 6 and 7 with the same results.

When it is not desired to maintain a constant flow of air into the apparatus I can also regulate the SO₂ concentration by increasing or decreasing the flow of air into either or both the volatilization and respectively the combustion zone, but in this case the operation is not as sensitive as when operating with a constant total flow of air.

The temperature of the final gases as they leave the combustion chamber is around 450 to 800° C. and it is with modern temperature measuring devices easy to determine differences of a few degrees C. such as 2 or 3°.

Having, for instance, found that on a burden of 25,000 pounds sulphur a temperature of 500° C. corresponds to a concentration of 8% SO₂, and I read a temperature of 505° at 8, I dampen air ports at 4; it will then be found that in 2 or 3 minutes the temperature will be down to 500°. Continuing to watch my temperature in this manner and holding it closely to the norm by regulating the air inlets at 4 or 6 and 7, I find that my SO₂ analysis recorder as installed after the cooling and purifying equipment will show a practically straight line, with variations not exceeding 2/10% above or below the desired concentration.

The great advantage of controlling the SO₂ concentration of burner gases by measuring the temperature of the completely burned gases and adjusting the air supply accordingly over other devices of effecting such control, is the fact that there is very little lapse of time between the determination of the temperature of the gases and the effect of the changed air supply upon the SO₂ concentration.

Whereas there is a lapse of at least 15 minutes between the time the gases are produced and their composition analyzed at the end of the purification and cooling zone in sulphuric acid plants, the temperature indication records the variations in composition practically instantaneously after the gases are produced.

A more complete control can be effected in my process when the air control is adjusted automatically according to temperature. A temperature recording instrument with maximum and minimum electrical contacts can be used and the two contacts are connected with mechanical devices, opening or closing air ports at 4 or 6 and 7, or at both ends of the rotating burner. With such automatic control the burning of the sulphur will never get out of control and the composition of the gases is kept within exceedingly close limits as, for instance, ± 1/10% of the desired concentration.

I claim:

1. The process of producing a sulphur dioxide combustion gas supply of closely limited SO₂ content within the range of concentrations useful in the manufacture of sulphuric acid, which comprises volatilizing and partly burning sulphur in contact with air in a volatilizing zone, adding air to the so obtained primary gases, completing the combustion in a combustion zone, measuring the temperature of the completely burned gases after they have left the combustion zone but before substantial cooling thereof, decreasing the air supply to the volatilization zone when the said temperature increases over a given norm and decreasing the air supply to said volatilizing zone when said temperature falls below said norm.

2. In a process of producing a sulphur dioxide combustion gas supply of closely limited SO₂ content within the range of concentrations useful in the manufacture of sulphuric acid, which involves as one step the burning of sulphur with a substantially constant supply of air, the steps of volatilizing elemental sulphur and burning part of said sulphur in contact with a part of the total air supply, adding the balance of said air to the so obtained primary gases, completing the combustion of the sulphur gases in a combustion zone, measuring the temperature of the completely burned sulphur gases after they have left said combustion zone but before substantial cooling thereof, regulating the air supply so that with increasing temperature less of the total air is supplied to the volatilizing zone and with decreasing temperature more of the total air is supplied to the volatilizing zone.

3. In a process of producing a sulphur dioxide combustion gas supply of substantially uniform SO₂ content within the range of concentrations between about 6 and 12% SO₂ which involves volatilizing and partly burning sulphur in contact with air in a first zone and completing the combustion in a second zone with additional air, the steps of determining the temperature of the completely burned gases after they have left said second zone but before substantial cooling thereof as is obtained when the gases have the desired SO₂ concentration, said temperature being within the range of about 450 to 800° C. and regulating the air supply to said zones by furnishing less air to the said first zone when the temperature of the gases increases more than about 5° C. above, and furnishing more air to the said first zone when the temperature of the gases falls more than 5° C. below the temperature determined for the desired SO₂ concentration.

4. In a process of producing burner gases for use in the manufacture of sulphuric acid which involves volatilizing and partly burning sulphur in contact with air in a volatilization zone, adding air to the so obtained primary burner gases and completing the combustion in a second combustion zone, the steps of determining the SO₂ concentration in the burner gases immediately after they have left the combustion zone, increasing the admission of air into said volatilization zone when the said $SO_2$ concentration decreases below a desired value and decreasing the admission of air into said volatilization zone when the said $SO_2$ concentration increases above said value, the said $SO_2$ concentration being determined by measuring the temperature of the said burner gases immediately after they have left the said combustion zone and before any substantial cooling thereof.

In testimony whereof, I affix my signature.

WALTER H. WEINBERG.

CERTIFICATE OF CORRECTION.

Patent No. 1,863,705.  June 21, 1932.

WALTER H. WEINBERG.

It is hereby certified that error appears in the printed specification of the above numbered patent requiring correction as follows: In the drawing, for pipe "7" read 9; page 3, line 74, claim 1, for "decreasing" read increasing; and that the said Letters Patent should be read with these corrections therein that the same may conform to the record of the case in the Patent Office.

Signed and sealed this 4th day of October, A. D. 1932.

(Seal)

M. J. Moore,
Acting Commissioner of Patents.